(12) United States Patent
Shinoda et al.

(10) Patent No.: US 12,117,041 B2
(45) Date of Patent: Oct. 15, 2024

(54) TURBO FLUID MACHINE

(71) Applicant: KABUSHIKI KAISHA TOYOTA JIDOSHOKKI, Aichi (JP)

(72) Inventors: Fumiya Shinoda, Aichi (JP); Fumihiro Suzuki, Aichi (JP); Takahito Kunieda, Aichi (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 93 days.

(21) Appl. No.: 18/081,181

(22) Filed: Dec. 14, 2022

(65) Prior Publication Data

US 2023/0204068 A1    Jun. 29, 2023

(30) Foreign Application Priority Data

Dec. 24, 2021  (JP) .................. 2021-211478

(51) Int. Cl.
| F16C 17/04 | (2006.01) |
| F16C 17/08 | (2006.01) |
| F16C 17/26 | (2006.01) |
| F16C 27/02 | (2006.01) |
| F16C 35/02 | (2006.01) |
| F16C 37/00 | (2006.01) |

(52) U.S. Cl.
CPC ............ *F16C 17/042* (2013.01); *F16C 17/08* (2013.01); *F16C 17/26* (2013.01); *F16C 27/02* (2013.01); *F16C 35/02* (2013.01); *F16C 37/00* (2013.01); *F16C 2360/24* (2013.01)

(58) Field of Classification Search
CPC ..................................... F16C 17/042
See application file for complete search history.

(56) References Cited

U.S. PATENT DOCUMENTS

| 9,157,473 | B2* | 10/2015 | Park .................. F16C 17/10 |
| 11,892,032 | B2* | 2/2024 | Omori .................. F16C 27/02 |
| 2011/0150376 | A1* | 6/2011 | Lee .................. F16C 17/243 |
| | | | 384/105 |
| 2021/0310515 | A1 | 10/2021 | Omori |
| 2021/0341013 | A1* | 11/2021 | Omori .................. F16C 17/042 |

FOREIGN PATENT DOCUMENTS

WO    WO2020130124 A1    6/2020

\* cited by examiner

*Primary Examiner* — James Pilkington
(74) *Attorney, Agent, or Firm* — Greenblum & Bernstein, P.L.C.

(57) ABSTRACT

A turbo fluid machine includes a partition wall separating an inside of a housing into a compression space and a bearing space; and a foil bearing. The partition wall includes a support part having an end face raised toward a thrust collar in an axial direction. The support part has a groove formed in the end face and radially extending to an outer peripheral surface of the support part. Top foils of the foil bearing each have one surface facing the thrust collar and the other surface elastically supported by corresponding one of bump foils of the foil bearing. The foil bearing is mounted on the end face such that a position of the groove corresponds to a position of a gap between the bump foils and a position of a gap between the top foils and such that the groove faces the thrust collar in the axial direction.

3 Claims, 8 Drawing Sheets

TURBO FLUID MACHINE

CROSS-REFERENCE TO RELATED APPLICATION

This application claims priority to Japanese Patent Application No. 2021-211478 filed on Dec. 24, 2021, the entire disclosure of which is incorporated herein by reference.

FIELD OF THE DISCLOSURE

The present disclosure relates to a turbo fluid machine.

BACKGROUND ART

Domestic re-publication of PCT international publication for patent application No. WO2020130124 discloses a known turbo fluid machine. This turbo fluid machine includes a rotary shaft configured to rotate about the axis of the rotary shaft, a thrust collar having a plate-like shape, an operating part, and a housing for accommodating the rotary shaft, the thrust collar, and the operating part. The thrust collar extends from a peripheral surface of the rotary shaft in the radial direction of the rotary shaft, and is rotatable together with the rotary shaft. The operating part is configured to rotate together with the rotary shaft to compress and discharge a fluid.

This turbo fluid machine further includes a shaft support member having a plate-like shape and a foil bearing. The shaft support member has an insertion hole which is formed through the shaft support member and through which the rotary shaft is inserted. The foil bearing supports the thrust collar in the axial direction of the rotary shaft such that the thrust collar is rotatable relative to the shaft support member.

The foil bearing includes a plurality of bump foils each formed of an elastic thin plate having a corrugated shape, and a plurality of top foils each formed of an elastic thin plate. The bump foils are mounted on an end face of the shaft support member adjacent to the thrust collar, and spaced from each other around the insertion hole. Each top foil has one surface facing the thrust collar and the other surface elastically supported by the bump foils. The one surface of the top foil adjacent to the thrust collar serves as a bearing surface, and one surface of the thrust collar adjacent to the top foil serves as a bearing-contact surface that faces the bearing surface in the axial direction of the rotary shaft.

In the foil bearing, at low speed rotation of the rotary shaft, the rotating thrust collar is supported by the top foil with the top foil contacting the thrust collar. At high speed rotation of the rotary shaft, the thrust collar is supported by a fluid film produced in a gap between the bearing-contact surface and the bearing surface without the top foil contacting the thrust collar.

This kind of foil bearing is likely to become high temperature because the top foil is formed of an elastic thin plate having a low heat capacity, so that the foil bearing may have a problem on a heat resistance of the top foil.

This known turbo fluid machine has a cooling passage formed in the housing so as to cool the foil bearing (see WO2020130124, third embodiment, FIGS. 7 and 8). The cooling fluid in the cooling passage is introduced into a space (i.e., opposite space) located on the opposite side of the thrust collar with respect to the shaft support member. The fluid introduced in the opposite space is then introduced into a space (i.e., bearing space) between the shaft support member and the thrust collar through a gap between the insertion hole of the shaft support member and the rotary shaft and a through hole formed through the shaft support member in the axial direction. The cooling fluid introduced into the bearing space flows radially outward through a circumferential gap, which radially extends between the circumferentially adjacent bump foils, so as to cool the top foils and the bump foils.

However, if such a turbo fluid machine has, in the opposite space, a compression space for accommodating the operating part, a partition wall for defining the compression space in the opposite space needs to be formed separately from the shaft support member so as not to decrease efficiency of the fluid compression by the operating part when the cooling fluid for cooling the foil bearing is introduced into the opposite space with respect to the shaft support member. The provision of the partition wall needs an increase in the size of the turbo fluid machine in the axial direction.

The present disclosure, which has been made in light of the above-mentioned problem, is directed to providing a turbo fluid machine that is capable of cooling a foil bearing effectively without an increase in the size of the turbo fluid machine in the axial direction.

SUMMARY

In accordance with an aspect of the present disclosure, there is provided a turbo fluid machine that includes: a rotary shaft, a thrust collar, an operating part, a housing, a partition wall, and a foil bearing. The rotary shaft is configured to rotate about an axis of the rotary shaft. The thrust collar has a plate-like shape and extends from a peripheral surface of the rotary shaft in a radial direction of the rotary shaft. The thrust collar is rotatable together with the rotary shaft. The operating part is configured to rotate together with the rotary shaft to compress and discharge a fluid. The housing accommodates the rotary shaft, the thrust collar, and the operating part. The partition wall has an insertion hole which is formed through the partition wall and through which the rotary shaft is inserted. The partition wall separates an inside of the housing into a compression space in which the operating part is accommodated and a bearing space in which the thrust collar is accommodated. The foil bearing supports the thrust collar in an axial direction of the rotary shaft such that the thrust collar is rotatable relative to the partition wall. The partition wall includes a support part having an end face raised toward the thrust collar in the axial direction. The support part has a groove formed in the end face and extending in the radial direction to an outer peripheral surface of the support part. The foil bearing includes: a plurality of bump foils each formed of an elastic thin plate having a corrugated shape and mounted on the end face; and a plurality of top foils each formed of an elastic thin plate. The bump foils are arranged around the insertion hole with a gap between the adjacent bump foils. The top foils are arranged around the insertion hole with a gap between the adjacent top foils, and each have one surface facing the thrust collar and the other surface elastically supported by the corresponding bump foil. The foil bearing is mounted on the support part such that a position of the groove corresponds to a position of the gap between the bump foils and a position of the gap between the top foils and such that the groove faces the thrust collar in the axial direction.

Other aspects and advantages of the disclosure will become apparent from the following description, taken in conjunction with the accompanying drawings, illustrating by way of example the principles of the disclosure.

BRIEF DESCRIPTION OF THE DRAWINGS

The present disclosure together with objects and advantages thereof, may best be understood by reference to the following description of the embodiments together with the accompanying drawings in which.

DETAILED DESCRIPTION OF EMBODIMENTS

The following will describe first to third embodiments of the present disclosure in detail with reference to the accompanying drawings.

First Embodiment

According to this embodiment, a turbo compressor 10 serves as the turbo fluid machine of the present disclosure. The turbo compressor 10 is mounted on a fuel cell vehicle that includes a fuel cell system 1. The fuel cell system 1 supplies oxygen and hydrogen to a fuel cell mounted on the vehicle for electricity generation. The turbo compressor 10 compresses air containing oxygen to be supplied to the fuel cell.

Figure 1:
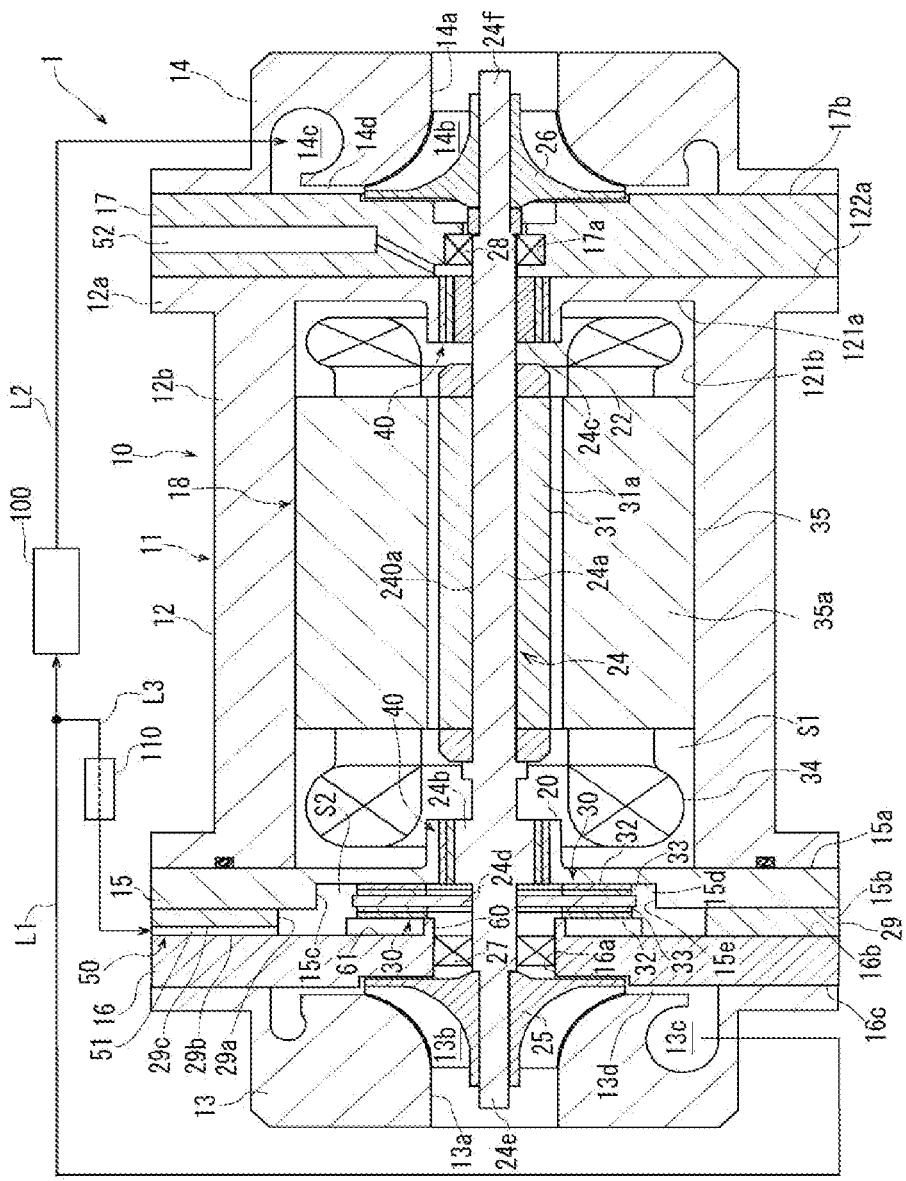
FIG. 1 is a sectional view of a turbo compressor according to a first embodiment.

As illustrated in FIG. 1, the turbo compressor 10, which serves as the turbo fluid machine of the present disclosure, includes a housing 11. The housing 11 is made of metal, such as aluminum alloy. The housing 11 includes a motor housing 12, a compressor housing 13, a turbine housing 14, a first plate 15, a second plate 16, a third plate 17, and a fourth plate 29. The second plate 16 serves as the partition wall of the present disclosure.

The motor housing 12 includes a plate-like end wall 12a and a peripheral wall 12b. The peripheral wall 12b has a cylindrical shape and protrudes from an outer peripheral portion of the end wall 12a. The first plate 15 is connected to an open end of the peripheral wall 12b of the motor housing 12 to close an opening of the peripheral wall 12b.

In the motor housing 12, an inner surface 121a of the end wall 12a, an inner peripheral surface 121b of the peripheral wall 12b, and an end face 15a of the first plate 15 adjacent to the motor housing 12 cooperate to define a motor chamber S1. The motor chamber S1 accommodates an electric motor 18.

The first plate 15 has a first bearing holding portion 20. The first bearing holding portion 20 projects from the center portion of the end face 15a of the first plate 15 toward the electric motor 18. The first bearing holding portion 20 has a cylindrical shape.

The other end face 15b of the first plate 15 is distant from the motor housing 12, and has a recess 15c having a bottom surface 15d. The recess 15c has a circular hole shape. The cylindrical first bearing holding portion 20 is opened toward the bottom surface 15d of the recess 15c through the first plate 15. The recess 15c is formed coaxially with the first bearing holding portion 20. The recess 15c has an inner peripheral surface 15e through which the end face 15b is connected to the bottom surface 15d.

The motor housing 12 has a second bearing holding portion 22. The second bearing holding portion 22 projects from the center portion of the inner surface 121a of the end wall 12a of the motor housing 12 toward the electric motor 18. The second bearing holding portion 22 has a cylindrical shape. The cylindrical second bearing holding portion 22 is opened on an outer surface 122a of the end wall 12a through the end wall 12a of the motor housing 12. The first bearing holding portion 20 is formed coaxially with the second bearing holding portion 22.

Figure 2:
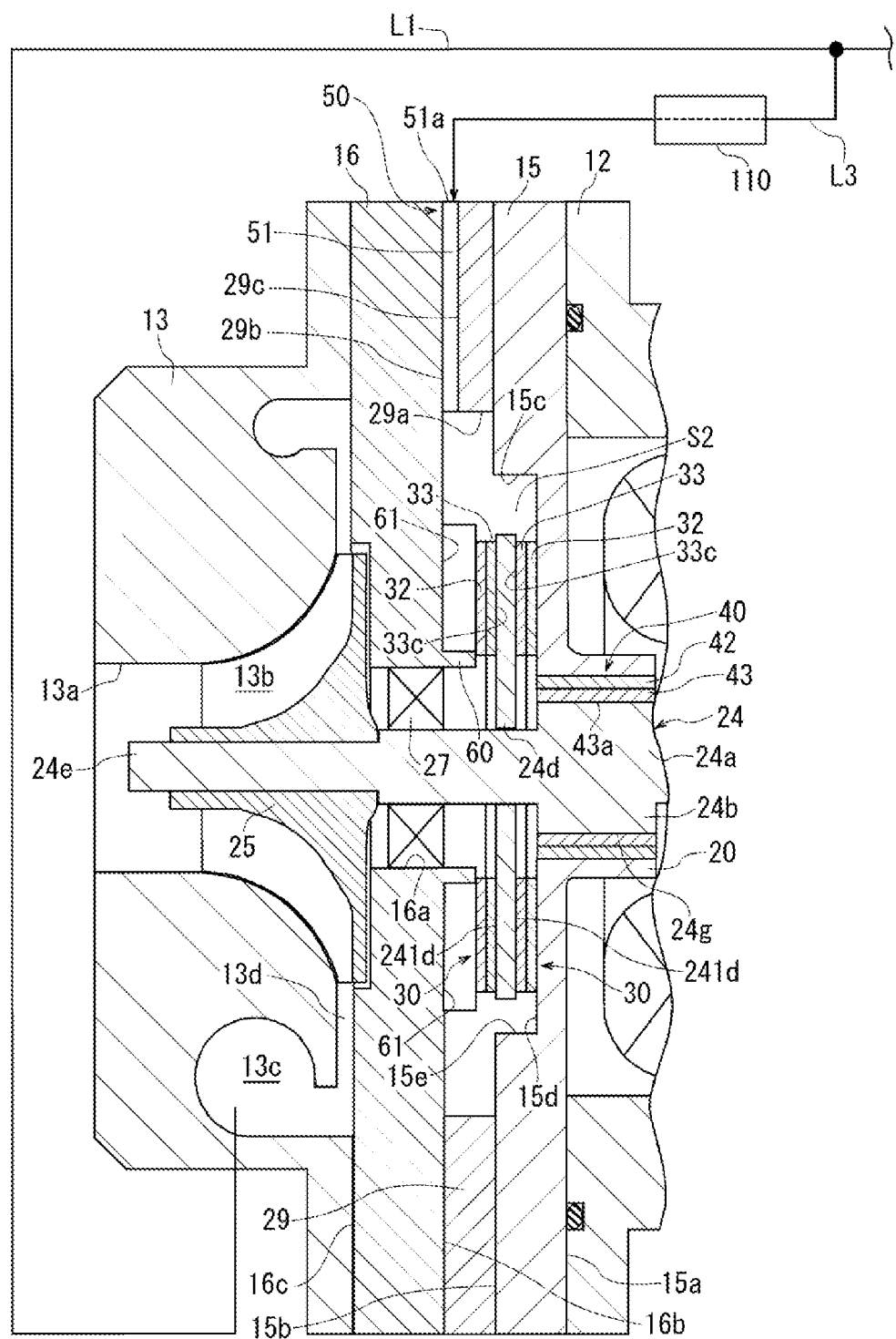
FIG. 2 is a fragmentary enlarged sectional view of the turbo compressor according to the first embodiment.
Figure 4:
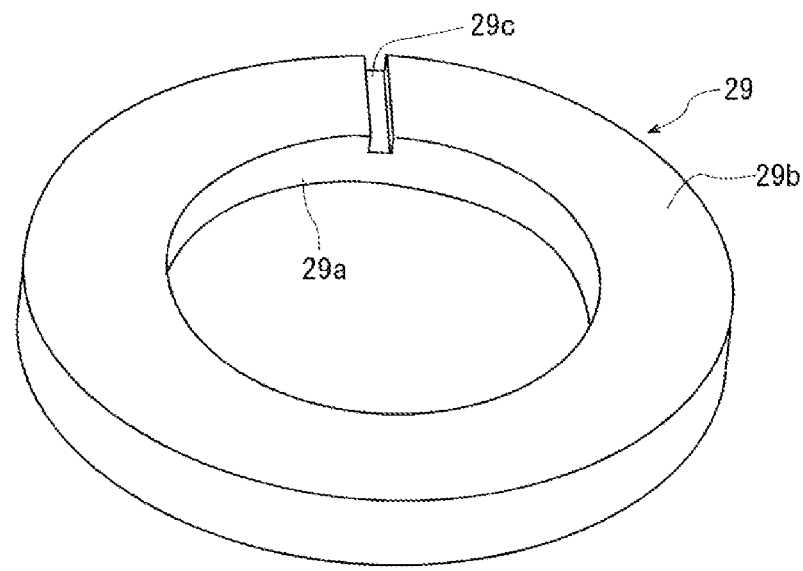
FIG. 4 is a perspective view of a fourth plate of the turbo compressor according to the first embodiment.

As illustrated in FIG. 2, the fourth plate 29 is connected to the end face 15b of the first plate 15. As illustrated in FIG. 4, the fourth plate 29 has a ring shape and has a center hole 29a. The center hole 29a is communicated with the recess 15c. The fourth plate 29 has a communication groove 29c formed in an end face 29b of the fourth plate 29 that is distant from the first plate 15. The communication groove 29c extends in a radial direction of the fourth plate 29, and the opposite ends of the communication groove 29c are respectively opened on the outer peripheral surface and the inner peripheral surface of the fourth plate 29. The communication groove 29c extends in the radial direction toward the axis of the rotary shaft 24a from the outer peripheral surface of the fourth plate 29.

The second plate 16 is connected to the end face 29b of the fourth plate 29. The second plate 16 has a shaft insertion hole 16a, which serves as the insertion hole of the present disclosure, formed through the center portion of the second plate 16 and through which the rotary shaft 24a is inserted. The shaft insertion hole 16a is communicated with the recess 15c through the center hole 29a. The shaft insertion hole 16a is formed coaxially with the center hole 29a, the recess 15c, and the first bearing holding portion 20. The second plate 16 has an end face 16b that is located adjacent to the fourth plate 29, and the end face 16b cooperates with the center hole 29a of the fourth plate 29 and the recess 15c of the first plate 15 to define a thrust bearing accommodation chamber S2. The thrust bearing accommodation chamber S2 serves as the bearing space of the present disclosure.

The compressor housing 13 has a cylindrical shape, and has a circular hole-shaped inlet 13a through which air is drawn into the compressor housing 13. The compressor housing 13 is connected to an end face 16c of the second plate 16 that is distant from the first plate 15. The inlet 13a of the compressor housing 13 is formed coaxially with the shaft insertion hole 16a of the second plate 16 and the first bearing holding portion 20. The inlet 13a is opened on an end face of the compressor housing 13 that is distant from the second plate 16.

A first bladed wheel chamber 13b, a discharge chamber 13c, and a first diffuser passage 13d are formed between the compressor housing 13 and the end face 16c of the second plate 16. The first bladed wheel chamber 13b is communicated with the inlet 13a. The discharge chamber 13c extends about the axis of the inlet 13a around the first bladed wheel chamber 13b. The first bladed wheel chamber 13b is communicated with the discharge chamber 13c through the first diffuser passage 13d. The first bladed wheel chamber 13b is communicated with the shaft insertion hole 16a of the second plate 16. The first bladed wheel chamber 13b serves as the compression space of the present disclosure.

Figure 3:
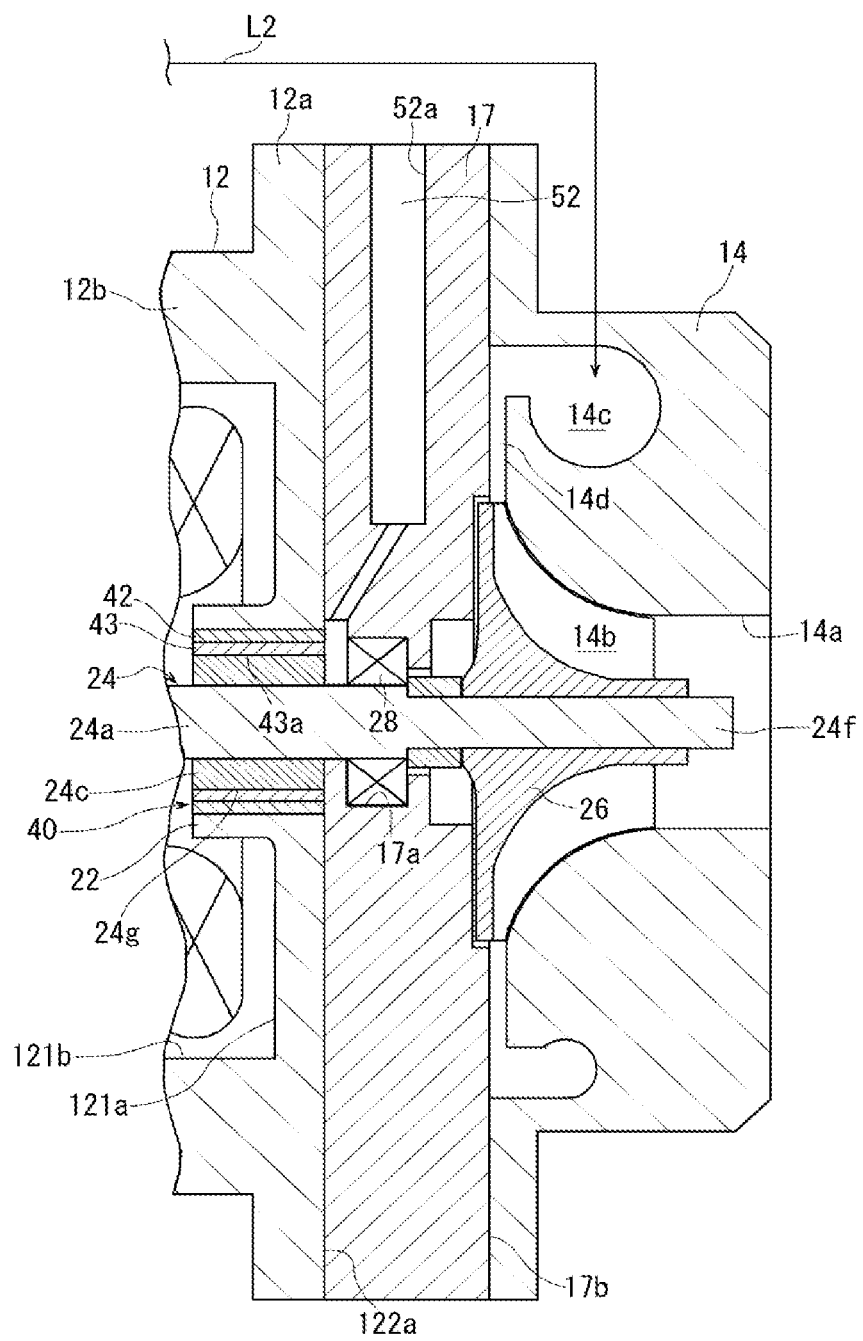
FIG. 3 is another fragmentary enlarged sectional view of the turbo compressor according to the first embodiment.

As illustrated in FIG. 3, the third plate 17 is connected to the outer surface 122a of the end wall 12a of the motor housing 12. The third plate 17 has a shaft insertion hole 17a at the center portion of the third plate 17. The shaft insertion hole 17a is communicated with the cylindrical second bearing holding portion 22. The shaft insertion hole 17a is formed coaxially with the second bearing holding portion 22.

The turbine housing 14 has a cylindrical shape, and has a circular hole-shaped outlet 14a through which air is discharged. The turbine housing 14 is connected to an end face 17b of the third plate 17 that is distant from the motor housing 12. The outlet 14a of the turbine housing 14 is formed coaxially with the shaft insertion hole 17a of the third plate 17 and the second bearing holding portion 22. The outlet 14a is opened on an end face of the turbine housing 14 that is distant from the third plate 17.

A second bladed wheel chamber 14b, a suction chamber 14c, and a second diffuser passage 14d are formed between the turbine housing 14 and the end face 17b of the third plate 17. The second bladed wheel chamber 14b is communicated with the outlet 14a. The suction chamber 14c extends about the axis of the outlet 14a around the second bladed wheel chamber 14b. The second bladed wheel chamber 14b is communicated with the suction chamber 14c through the second diffuser passage 14d. The second bladed wheel chamber 14b is communicated with the shaft insertion hole 17a of the third plate 17.

As illustrated in FIG. 1, a rotating member 24 is accommodated in the housing 11. The rotating member 24 has a rotary shaft 24a as a shaft portion, a first supported portion 24b, a second supported portion 24c, and a third supported portion 24d. The rotary shaft 24a has a first end portion 24e as an end adjacent to the compressor housing 13 and a second end portion 24f as an end adjacent to the turbine housing 14. The first supported portion 24b is formed in a part of an outer peripheral surface 240a of the rotary shaft 24a adjacent to the first end portion 24e, and disposed in the cylindrical first bearing holding portion 20. The first supported portion 24b is formed integrally with the rotary shaft 24a and projected from the outer peripheral surface 240a of the rotary shaft 24a so as to have a ring shape.

The second supported portion 24c is formed in a part of the outer peripheral surface 240a of the rotary shaft 24a adjacent to the second end portion 24f, and disposed in the cylindrical second bearing holding portion 22. The second supported portion 24c has a cylindrical shape such that the second supported portion 24c is projected from the outer peripheral surface 240a of the rotary shaft 24a so as to have a ring shape, and is fixed to the outer peripheral surface 240a of the rotary shaft 24a. The second supported portion 24c is rotatable together with the rotary shaft 24a.

The third supported portion 24d is disposed in the thrust bearing accommodation chamber S2. The third supported portion 24d has a disc shape (i.e., plate-like shape) such that the third supported portion 24d extends from the outer peripheral surface 240a of the rotary shaft 24a in the radial direction of the rotary shaft 24a so as to have a ring shape, and is fixed to the outer peripheral surface 240a of the rotary shaft 24a. The third supported portion 24d is rotatable together with the rotary shaft 24a. The third supported portion 24d is disposed distant from the electric motor 18 in the axial direction of the rotary shaft 24a. The third supported portion 24d serves as the thrust collar of the present disclosure.

In the following description, directions, such as the axial direction, the circumferential direction, and the radial direction denote the directions of the rotary shaft 24a. One side and the other side in the axial direction respectively mean a side on which the first end portion 24e of the rotary shaft 24a is located and a side on which the second end portion 24f of the rotary shaft 24a is located.

The first end portion 24e of the rotary shaft 24a is connected to a first bladed wheel 25 that serves as the operating part of the present disclosure. The first bladed wheel 25 is disposed closer to the first end portion 24e than to the third supported portion 24d of the rotary shaft 24a. The first bladed wheel 25 is accommodated in the first bladed wheel chamber 13b. The second end portion 24f of the rotary shaft 24a is connected to a second bladed wheel 26. The second bladed wheel 26 is disposed closer to the second end portion 24f than to the second supported portion 24c of the rotary shaft 24a. The second bladed wheel 26 is accommodated in the second bladed wheel chamber 14b. The first bladed wheel 25, the second bladed wheel 26, and the rotating member 24 are accommodated in the housing 11.

A first sealing member 27 is disposed between the shaft insertion hole 16a of the second plate 16 and the rotary shaft 24a. The first sealing member 27 seals a gap between the shaft insertion hole 16a and the rotary shaft 24a to suppress leak of air from the first bladed wheel chamber 13b toward the motor chamber S1. A second sealing member 28 is disposed between the shaft insertion hole 17a of the third plate 17 and the rotating member 24. The second sealing member 28 seals a gap between the shaft insertion hole 17a and the rotary shaft 24a to suppress leak of air from the second bladed wheel chamber 14b toward the motor chamber S1. The first sealing member 27 and the second sealing member 28 are each a seal ring, for example. The first sealing member 27 serves as the sealing member of the present disclosure.

The second plate 16 has, in the shaft insertion hole 16a, the first sealing member 27 for sealing the gap between the shaft insertion hole 16a and the rotary shaft 24a, so that the inside of the housing 11 is separated into the first bladed wheel chamber 13b and the thrust bearing accommodation chamber S2.

The electric motor 18 includes a cylindrical rotor 31 and a cylindrical stator 35. The rotor 31 is fixed to the rotary shaft 24a. The stator 35 is fixed in the housing 11. The rotor 31 is disposed radially inside the stator 35 and rotated together with the rotating member 24. The rotor 31 includes a cylindrical rotor core 31a fixed to the rotary shaft 24a and a plurality of permanent magnets, which is not illustrated, disposed in the rotor core 31a. The stator 35 surrounds the rotor 31. The stator 35 includes a stator core 35a and a coil 34. The stator core 35a has a cylindrical shape and is fixed to the inner peripheral surface 121b of the peripheral wall 12b of the motor housing 12. The coil 34 is wound around the stator core 35a. The coil 34 receives current from a battery (not illustrated) so that the rotor 31 is rotated together with the rotating member 24.

The fuel cell system 1 includes a fuel cell stack 100 as a fuel cell mounted on a vehicle, the turbo compressor 10, a supply passage L1, a discharge passage L2, and a branched passage L3. The fuel cell stack 100 includes a plurality of fuel cells. The fuel cell stack 100 is connected to the discharge chamber 13c through the supply passage L1. The fuel cell stack 100 is also connected to the suction chamber 14c through the discharge passage L2. The branched passage L3 in which an intercooler 110 is disposed branches off from the supply passage L1. The intercooler 110 cools air flowing through the branched passage L3.

When the rotating member 24 is rotated together with the rotor 31, the first bladed wheel 25 and the second bladed wheel 26 are rotated together with the rotating member 24. With this rotation, air, which has been drawn through the inlet 13a, is compressed by the first bladed wheel 25 in the first bladed wheel chamber 13b, and discharged from the discharge chamber 13c through the first diffuser passage 13d. The air discharged from the discharge chamber 13c is supplied to the fuel cell stack 100 through the supply passage L1. The air supplied to the fuel cell stack 100 is used by the fuel cell stack 100 for electricity generation, and the used air is then discharged as exhaust from the fuel cell stack 100 to the discharge passage L2. The exhaust from the fuel cell stack 100 is drawn into the suction chamber 14c through the discharge passage L2. The exhaust drawn into the suction chamber 14c is then discharged to the second bladed wheel chamber 14b through the second diffuser passage 14d. The exhaust discharged into the second bladed wheel chamber 14b rotates the second bladed wheel 26. The rotating member 24 is driven to rotate by the electric motor 18, and also by the rotation of the second bladed wheel 26 by the exhaust from the fuel cell stack 100. The first bladed wheel 25 serving as the operating part of the present disclosure is rotated together with the rotating member 24 to compress and discharge air serving as the fluid of the present disclosure. The exhaust discharged into the second bladed wheel chamber 14b is discharged outside from the outlet 14a.

In the following description, the rotating member 24 is rotated together with the rotor 31 in a rotational direction R. In this embodiment, the rotational direction of the rotary shaft 24a is indicated by the arrow R in FIGS. 6-9, and the rotating member 24 and the rotor 31 rotate in the counter-clockwise direction in FIG. 6. The turbo compressor 10 includes a pair of thrust foil bearings 30, 30 and a pair of radial foil bearings 40, 40. The pair of thrust foil bearings 30, 30 supports the third supported portion 24d of the rotating member 24 in the axial direction of the rotary shaft 24a such that the third supported portion 24d is rotatable relative to the housing 11 (i.e., the second plate 16). The pair of radial foil bearings 40, 40 supports the first supported portion 24b and the second supported portion 24c of the rotating member 24 in a direction perpendicular to the axial direction of the rotary shaft 24a such that the first supported portion 24b and the second supported portion 24c are rotatable relative to the housing 11.

The pair of thrust foil bearings 30, 30 is disposed in the thrust bearing accommodation chamber S2. The thrust foil bearings 30, 30 hold therebetween the third supported portion 24d as the thrust collar. The thrust foil bearings 30, 30 face the third supported portion 24d in the axial direction of the rotary shaft 24a. One of the thrust foil bearings 30, 30 is located adjacent to the first end portion 24e of the rotary shaft 24a with respect to the third supported portion 24d. The other of the thrust foil bearings 30, 30 is located adjacent to the second end portion 24f of the rotary shaft 24a with respect to the third supported portion 24d.

As illustrated in FIG. 2, the opposite end faces of the third supported portion 24d serve as bearing-contact surfaces 241d, 241d. One of the bearing-contact surfaces 241d, 241d adjacent to the first end portion 24e of the rotary shaft 24a is axially supported by the one of the thrust foil bearings 30, 30. The other of the bearing-contact surfaces 241d, 241d adjacent to the second end portion 24f of the rotary shaft 24a is axially supported by the other of the thrust foil bearings 30, 30.

Figure 5:
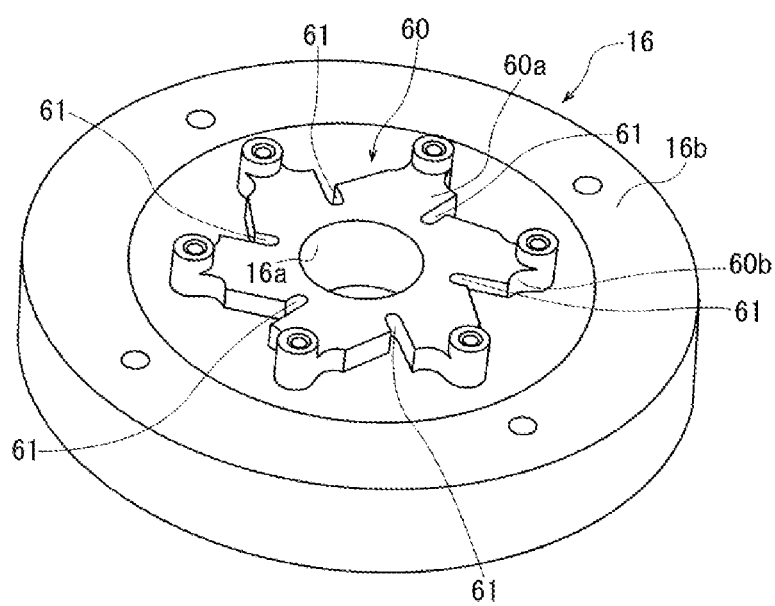
FIG. 5 is a perspective view of the turbo compressor according to the first embodiment, illustrating a second plate serving as a partition wall.

As illustrated in FIGS. 2 and 5, the second plate 16 includes a support part 60 that is integrally formed with the end face 16b of the second plate 16 adjacent to the fourth plate 29. The support part 60 projects axially from the center portion of the second plate 16 toward the third supported portion 24d. The shaft insertion hole 16a continuously extends also through the center portion of the support part 60. The support part 60 is disposed inside the center hole 29a of the fourth plate 29.

The support part 60 has six grooves that extend from an end face 60a of the support part 60 raised in the axial direction toward the third supported portion 24d. In other words, six passages 61 each having a groove shape are formed in the end face 60a of the support part 60. Each of the passages 61 serves as the groove of the present disclosure. The passages 61 are equally spaced from each other in a circumferential direction of the rotary shaft 24a. Each of the passages 61 extends to an outer peripheral surface 60b of the support part 60. That is, the passage 61 has an opening 61a that is opened on the outer peripheral surface 60b of the support part 60 (see FIGS. 6 and 7). The passage 61 extends from the outer peripheral surface 60b of the support part 60 in the radial direction toward the axis of the rotary shaft 24a. The end of the passage 61 on the inner peripheral side of the support part 60 extends to a vicinity of the shaft insertion hole 16a.

As illustrated in FIG. 2, the one of the thrust foil bearings 30, 30 is mounted on the end face 60a of the support part 60 of the second plate 16, and the other of the thrust foil bearings 30, 30 is mounted on the bottom surface 15d of the recess 15c of the first plate 15. The other of the thrust foil bearings 30, 30 may be mounted on a covering member, which is not illustrated, and the covering member may be fastened to a support part with a screw and adjoined to the first plate 15.

Figure 6:
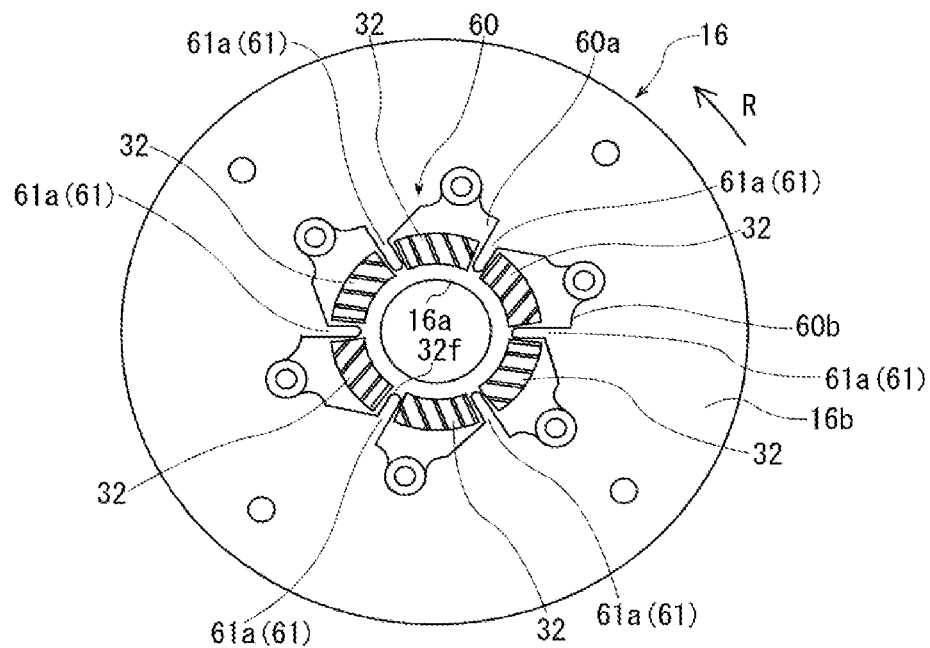
FIG. 6 is a plane view of the turbo compressor according to the first embodiment, illustrating a support part of the partition wall in which a bump foil is arranged.
Figure 8:
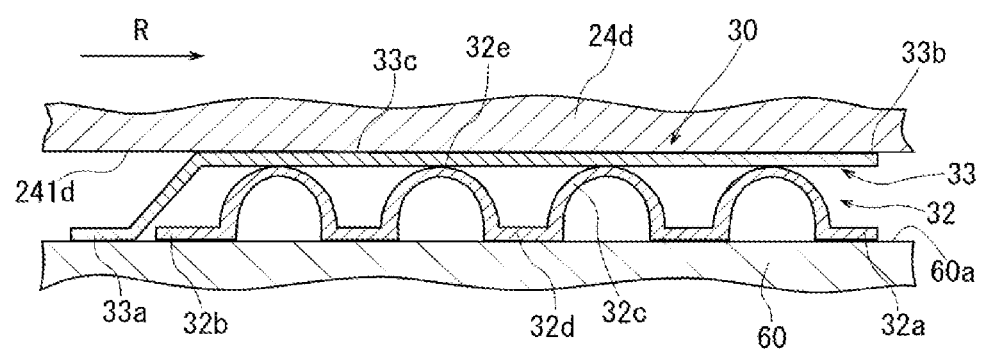
FIG. 8 is a sectional view of the turbo compressor according to the first embodiment, explaining the operation of a thrust foil bearing.

As illustrated in FIG. 6, six bump foils 32 each having a plate-like shape are mounted on the end face 60a of the support part 60, and arranged and equally spaced from each other (i.e., with a gap between the adjacent bump foils 32) around the shaft insertion hole 16a. As illustrated in FIG. 8, each of the bump foils 32 has opposite ends in the circumferential direction, and one of the opposite ends is fixed to the end face 60a of the support part 60 by welding. That is, the one end and the other end of the bump foil 32 in the circumferential direction are a fixed end 32a and a free end 32b, respectively. Reversely, the other end and the one end of the bump foil 32 in the circumferential direction may be a fixed end and a free end, respectively.

Each of the bump foils 32 has an approximately fan-like outline in a plane view. The bump foil 32 is made of an elastic thin metal plate, such as a stainless steel plate, and has a corrugated shape in which a plurality of projections 32c and a plurality of depressions 32d are alternatingly arranged in the circumferential direction of the rotary shaft 24a. That is, a plurality of ridges 32e of the projections 32c are arranged in the circumferential direction of the rotary shaft 24a. The projections 32c of the bump foils 32 are projected toward the third supported portion 24d to come in contact with a plurality of top foils 33 so as to elastically support the top foils 33.

Figure 7:
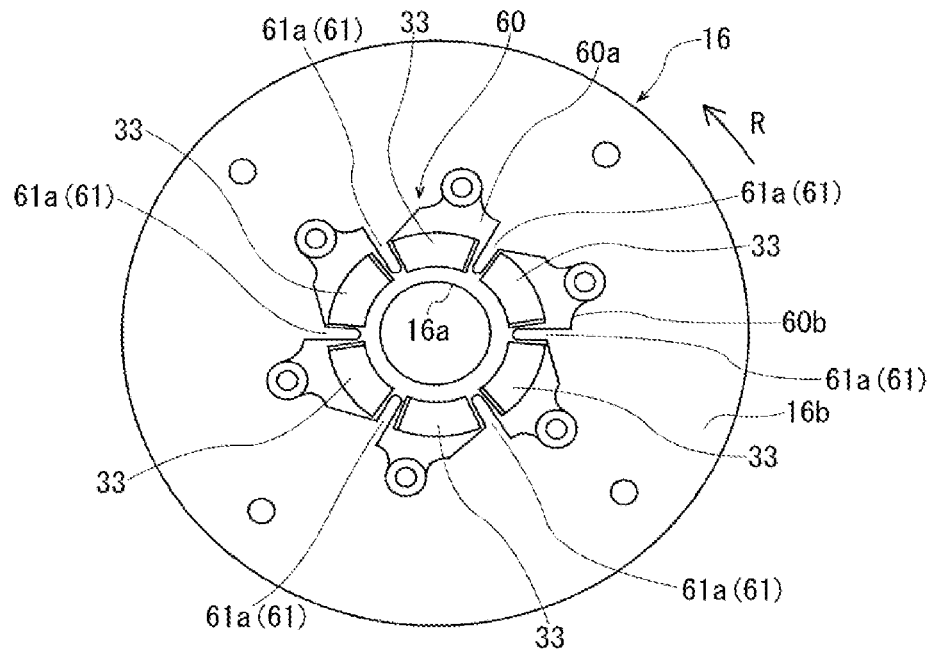
FIG. 7 is a plane view of the turbo compressor according to the first embodiment, illustrating the support part of the partition wall in which a top foil is arranged.

As illustrated in FIG. 7, in this embodiment, the six top foils 33 each having a plate-like shape are mounted on the end face 60a of the support part 60 and arranged around the shaft insertion hole 16a with a gap between the adjacent top foils 33. As illustrated in FIG. 8, each of the top foils 33 has opposite ends in the circumferential direction. One of the opposite ends is a free end and the other of the opposite ends is folded toward the support part 60 and is fixed by welding to the end face 60a of the support part 60 at the distal portion of the other end. That is, the other end and the one end of the top foil 33 in the circumferential direction are a fixed end 33a and a free end 33b, respectively. Each of the top foils 33 has an approximately fan-like outline in a plane view. The top foils 33 are each made of an elastic thin metal plate, such as a stainless steel plate, and has a predetermined shape.

The top foils 33 are equally spaced from each other in the circumferential direction of the rotary shaft 24a so as to respectively correspond to the bump foils 32, and elastically supported by the bump foils 32. Each of the top foils 33 has one surface facing the third supported portion 24d as the thrust collar and the other surface elastically supported by the corresponding bump foil 32. The one surface of the top foil 33 serves as a bearing surface 33c that faces the bearing-contact surface 241d of the third supported portion 24d in the axial direction.

The thrust foil bearing 30 is mounted on the end face 60a of the support part 60 such that the position of each passage 61 corresponds to the position of the gap between the corresponding adjacent bump foils 32 and the position of the gap between the corresponding adjacent top foils 33 and such that each passage 61 faces the third supported portion 24d as the thrust collar in the axial direction. That is, the bump foils 32 are equally spaced from each other in the circumferential direction of the rotary shaft 24a while avoiding the six passages 61, and the top foils 33 are equally spaced from each other in the circumferential direction of the rotary shaft 24a while avoiding the six passages 61. The bump foils 32 and the top foils 33 are mounted on the end face 60a of the support part 60 while avoiding the passages 61. This allows the end face 60a of the support part 60 to reliably receive the loads of the bump foils 32. Each of the passages 61 is located in a circumferential gap 32f. Each of the circumferential gaps 32f is located between the bump foils 32 adjacent to each other in the circumferential direction of the rotary shaft 24a and extends in the radial direction that intersects the circumferential direction (see FIG. 6). In the following description, the circumferential gaps 32f each mean a gap located between the bump foils 32 adjacent to each other in the circumferential direction of the rotary shaft 24a and extending in a direction that intersects the circumferential direction.

In each of the circumferential gaps 32f, the passage 61 continuously extends from the outer peripheral edges of the adjacent bump foils 32 to the vicinity of the inner peripheral edges of the bump foils 32. Each of the passages 61 extends over almost the whole length of the bump foil 32 in the radial direction, so that, on an imaginary plane perpendicular to the axial direction of the rotary shaft 24a, the passage 61 overlaps most of the corresponding circumferential gap 32f in the radial direction intersecting the circumferential direction.

Similar to the one thrust foil bearing 30 mounted on the support part 60, the other thrust foil bearing 30 mounted on the recess 15c includes the six bump foils 32 and the six top foils 33.

One of the radial foil bearings 40, 40 is disposed in the first bearing holding portion 20, and the other of the radial foil bearings 40, 40 is disposed in the second bearing holding portion 22. In the first bearing holding portion 20, the first supported portion 24b of the rotating member 24 is rotatably supported by the one of the radial foil bearings 40, 40. The first supported portion 24b has an outer peripheral surface that serves as a radial bearing-contact surface 24g supported by the one of the radial foil bearings 40, 40 in the direction perpendicular to the axial direction of the rotary shaft 24a. In the second bearing holding portion 22, the second supported portion 24c of the rotating member 24 is rotatably supported by the other of the radial foil bearings 40, 40. The second supported portion 24c has an outer peripheral surface that also serves as the radial bearing-contact surface 24g supported by the other of the radial foil bearings 40, 40 in the direction perpendicular to the axial direction of the rotary shaft 24a.

Since the one and the other of the radial foil bearings 40, 40 have the same configuration, the following description will focus on the one of the radial foil bearings 40, 40, and will not elaborate the other of the radial foil bearings 40, 40.

The radial foil bearing 40 includes a radial bump foil 42 and a radial top foil 43. The radial bump foil 42 and the radial top foil 43 are each formed of an elastic thin metal plate, such as a stainless steel plate, and each have a predetermined approximately cylindrical shape. The radial bump foil 42 and the radial top foil 43 each have opposite ends in the circumferential direction of the rotary shaft 24a. One of the opposite ends of the radial bump foil 42 and one of the opposite ends of the radial top foil 43 are free ends, and the other of the opposite ends of the radial bump foil 42 and the other of the opposite ends of the radial top foil 43 are folded outwardly in the radial direction so as to be fixed to the inner peripheral surface of the first bearing holding portion 20. That is, the one ends and the other ends of the radial bump foil 42 and the radial top foil 43 in the circumferential direction are free ends and fixed ends, respectively.

The radial bump foil 42 has a corrugated shape in which a plurality of projections projected toward the radial top foil 43 has ridges arranged in the circumferential direction of the rotary shaft 24a. The radial bump foil 42 also has depressions alternating with the projections, and elastically supports the radial top foil 43 by the projections with the depressions supported by the first bearing holding portion 20. One of the opposite surfaces of the radial top foil 43 is elastically supported by the radial bump foil 42, and the other surface of the opposite surfaces of the radial top foil 43 serves as a radial bearing surface 43a (see FIGS. 2 and 3) that faces the radial bearing-contact surface 24g in the radial direction.

As illustrated in FIG. 8, the thrust foil bearings 30, 30 support the rotary shaft 24a with the bearing surface 33c of each top foil 33 contacting the bearing-contact surface 241d of the third supported portion 24d until the rotational speed of the rotary shaft 24a reaches a floating rotational speed at which the third supported portion 24d serving as the thrust collar floats off the thrust foil bearings 30, 30 (i.e., at low speed rotation).

Figure 9:
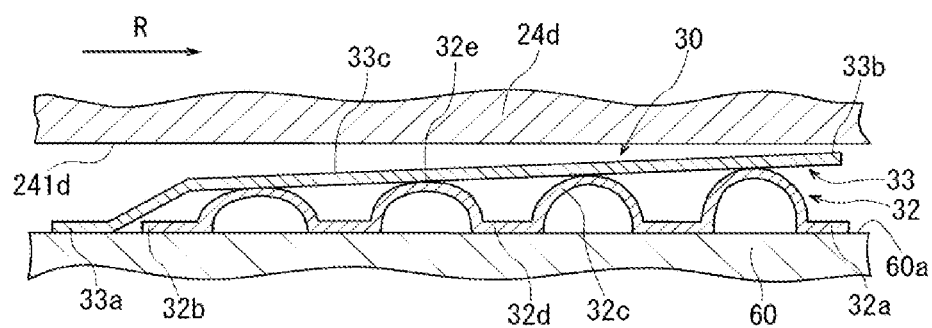
FIG. 9 is a sectional view of the turbo compressor according to the first embodiment, explaining the operation of the thrust foil bearing.

As illustrated in FIG. 9, when the rotational speed of the rotary shaft 24a reaches the floating rotational speed (i.e., at high speed rotation), a pressure of the fluid film generated between the top foil 33 and the third supported portion 24d causes the third supported portion 24d to float off the thrust foil bearings 30, 30 with elastic deformation of the bump foil 32. Accordingly, the thrust foil bearings 30, 30 support the rotary shaft 24a without contacting the third supported portion 24d.

The radial foil bearings 40, 40 support the rotary shaft 24a with the radial bearing surfaces 43a of the radial top foils 43 contacting the radial bearing-contact surface 24g of the first supported portion 24b and the radial bearing-contact surface 24g of the second supported portion 24c until the rotational speed of the rotary shaft 24a reaches a floating rotational speed at which the first supported portion 24b and the second supported portion 24c of the rotary shaft 24a float off the radial foil bearings 40, 40. When the rotational speed of the rotary shaft 24a reaches the floating rotational speed, a pressure of the fluid film generated between the radial top foils 43 and the first and second supported portions 24b, 24c causes the first and second supported portions 24b, 24c to float off the radial foil bearings 40, 40. Accordingly, the radial foil bearings 40, 40 support the rotary shaft 24a without contacting the first and second supported portions 24b, 24c.

As illustrated in FIGS. 1-3, the housing 11 has a cooling passage 50. Cooling air serving as the fluid of the present disclosure flows through the cooling passage 50. The cooling passage 50 is formed through the second plate 16, the fourth plate 29, the first plate 15, the motor housing 12, and the third plate 17. The cooling passage 50 includes a first passage 51 and a second passage 52. The passages 61 form a part of the cooling passage 50.

The first passage 51 is formed in the second plate 16 and the fourth plate 29. The first passage 51 has an inlet 51a that also serves as the opening of the communication groove 29c on the outer peripheral surface of the fourth plate 29. The inlet 51a of the first passage 51 is connected to the supply passage L1 through the branched passage L3. The first passage 51 is communicated with the motor chamber S1 through the communication groove 29c and the center hole 29a of the fourth plate 29, the thrust bearing accommodation chamber S2, and the one of the radial foil bearings 40, 40.

The second passage 52 is formed in the third plate 17. The second passage 52 has an outlet 52a formed in a side surface of the third plate 17. The second passage 52 is communicated with the motor chamber S1 through the other of the radial foil bearings 40, 40.

The air flowed through the supply passage L1 toward the fuel cell stack 100 partly flows into the first passage 51 through the branched passage L3. The air in the first passage 51 has been cooled by the intercooler 110 while flowing through the branched passage L3 so as to serve as the cooling air.

The cooling air flows into the first passage 51 through the inlet 51a and reaches the center hole 29a through the communication groove 29c of the fourth plate 29. The cooling air reached the center hole 29a mainly cools the one of the thrust foil bearings 30, 30. That is, the cooling air reached the center hole 29a through the communication groove 29c flows into the passages 61 from the openings 61a while flowing in the center hole 29a in the circumferential direction. The cooling air radially flows in the passages 61 from the outer peripheral side toward the inner peripheral side of the support part 60, and then flows out from each passage 61 located in the corresponding circumferential gap 32f between the bump foils 32 adjacent to each other in the circumferential direction of the rotary shaft 24a and extending in the radial direction. Since the passage 61 faces the third supported portion 24d as the thrust collar, the cooling air flowed from the passage 61 into the circumferential gap 32f cools the bump foils 32 and the top foils 33 while flowing in the direction intersecting the circumferential direction from the inner peripheral side toward the outer peripheral side by receiving a centrifugal force from the third supported portion 24d. Accordingly, the cooling air flowing in the direction intersecting the circumferential direction from the inner peripheral side toward the outer peripheral side effectively cools the top foils 33.

After cooling the one of the thrust foil bearings 30, 30, the cooling air flows radially outside of the third supported portion 24d, and flows in the other of the thrust foil bearings 30, 30 from the outer peripheral side toward the inner peripheral side to cool the other thrust foil bearing 30. Part of the cooling air flowed into the center hole 29a through the communication groove 29c directly cools the other of the thrust foil bearings 30, 30 without cooling the one of the thrust foil bearings 30, 30.

After flowing through the thrust bearing accommodation chamber S2, the cooling air flows in the one of the radial foil bearings 40, 40 from the one side toward the other side in the axial direction to cool the one of the radial foil bearings 40, 40. The cooling air flows through the one of the radial foil bearings 40, 40 and flows into the motor chamber S1.

The air in the motor chamber S1, for example, flows through a gap between the rotor 31 and the stator 35, and the air then flows into the second passage 52 through the other of the radial foil bearings 40, 40 and is discharged from the outlet 52a.

Accordingly, the cooling air flows through the cooling passage 50 so as to directly cool the electric motor 18, the pair of thrust foil bearings 30, 30, and the pair of radial foil bearings 40, 40.

At low speed rotation of the rotary shaft, the rotating thrust collar is supported by the top foils with the top foils contacting the thrust collar, so that the sliding of the thrust collar on the top foils generates heat. At high speed rotation of the rotary shaft, the fluid film is sheared between the thrust collar and each of the top foils, which generates heat. The top foils are each formed of an elastic thin plate having a low heat capacity. Accordingly, the thrust foil bearings 30, 30 and the radial foil bearings 40, 40 may have a problem on a heat resistance of the top foils 33 and the radial top foils 43. In this regard, in the turbo compressor 10, the cooling air flows in the thrust foil bearings 30, 30 and the radial foil bearings 40, 40, so that the cooling air cools the top foils 33 and the radial top foils 43, thereby solving the problem on the heat resistance of the top foils 33 and the radial top foils 43.

In this turbo compressor 10, it is desirable to actively cool the one of the thrust foil bearings 30, 30 since the one thrust foil bearing 30 adjacent to the first bladed wheel 25 is especially subjected to a large thrust load.

In this regard, the turbo compressor 10 has the passages 61. Each passage 61 is located in the corresponding circumferential gap 32f of the one of the thrust foil bearings 30, 30 and extends from the outer peripheral edges of the bump foils 32 to the vicinity of the inner peripheral edges of the bump foils 32, so that the cooling air is introduced into the passage 61. Accordingly, the one of the thrust foil bearings 30, 30 subjected to a large thrust load is actively cooled.

Further, in the turbo compressor 10, the gap between the shaft insertion hole 16*a* of the second plate 16 and the rotary shaft 24*a* is sealed by the first sealing member 27, and the second plate 16 separates the first bladed wheel chamber 13*b* as the compression space from the thrust bearing accommodation chamber S2 as the bearing space. The passage 61 for cooling the one of the thrust foil bearings 30 is not formed through the second plate 16 in the thickness direction, but the passage 61 is a groove-shaped passage formed in the end face 60*a* of the support part 60 that is integrally formed with the second plate 16. This configuration eliminates the need for an additional partition wall that defines the first bladed wheel chamber 13*b* in the opposite space located on the opposite side of the thrust bearing accommodation chamber S2 with respect to the second plate 16, thereby preventing an increase in the size of the turbo compressor 10 in the axial direction.

This configuration therefore allows the one of the thrust foil bearings 30, 30, which is especially subjected to a large thrust load, to be cooled effectively without causing an increase in the size of the turbo compressor 10 in the axial direction.

In this turbo compressor 10, the passage 61 is located in every circumferential gap 32*f* of the one thrust foil bearing 30. Each passage 61 extends over almost the whole length of the bump foil 32 in the radial direction. This allows the cooling air from the passages 61 to successfully cool almost the entire top foils 33 of the one of the thrust foil bearings 30, 30.

Second Embodiment

Figure 10:
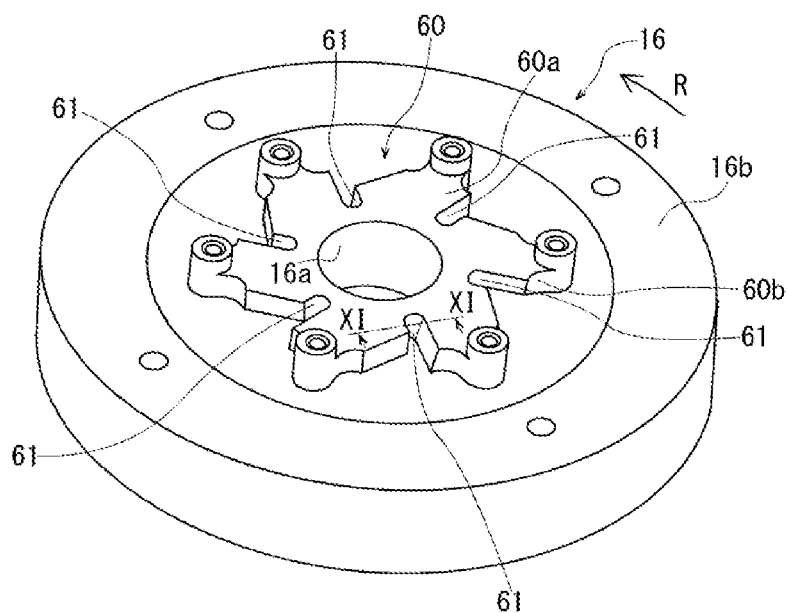
FIG. 10 is a perspective view of a turbo compressor according to a second embodiment, illustrating a second plate serving as a partition wall.
Figure 11:
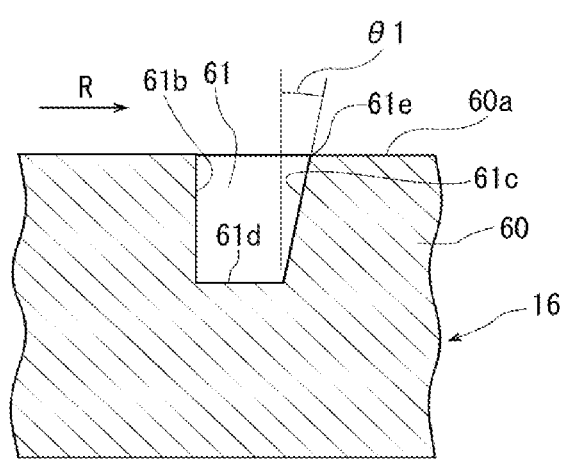
FIG. 11 is a sectional view of the turbo compressor according to the second embodiment taken along line XI-XI of FIG. 10.

As illustrated in FIGS. 10 and 11, this turbo compressor has the passages 61 formed in the support part 60, and each passage 61 has a shape modified from the shape of each passage 61 of the turbo compressor 10 according to the first embodiment.

Each passage 61 has a pair of groove side surfaces 61*b*, 61*c* facing each other in the circumferential direction of the rotary shaft 24*a* to define the passage 61, a bottom surface 61*d*, and an opening edge 61*e*. The groove side surface 61*c* preceding in the rotational direction R of the rotary shaft 24*a* is inclined in the rotational direction R at an angle of 61 from the bottom surface 61*d* to the opening edge 61*e* while extending in the axial direction.

Accordingly, the cooling air in the passage 61 receives a rotational force from the third supported portion 24*d* rotating in the rotational direction R, thereby smoothly flowing into the one of the thrust foil bearings 30, 30 along the inclined groove side surface 61*c* preceding in the rotational direction R.

Other elements and operations of this compressor are the same as those of the turbo compressor 10 according to the first embodiment.

Third Embodiment

Figure 12:
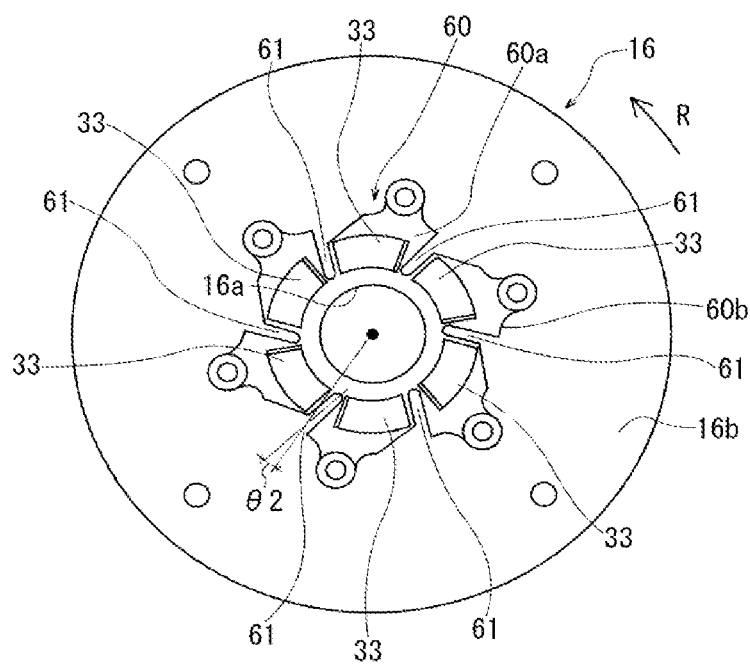
FIG. 12 is a plane view of a turbo compressor according to a third embodiment, illustrating a support part of a partition wall in which a top foil is arranged.

As illustrated in FIG. 12, this turbo compressor has the passages 61 formed in the support part 60, and each passage 61 has a shape modified from the shape of each passage 61 of the turbo compressor 10 according to the first embodiment. With this modification, the shapes of the bump foils 32 and the top foils 33 of the one of the thrust foil bearings 30, 30 are modified from the shapes of the bump foils 32 and the top foils 33 of the one of the thrust foil bearings 30, 30 of the turbo compressor 10 according to the first embodiment.

In the third embodiment, each passage 61 is inclined at an angle of 62 in the rotational direction R of the rotary shaft 24*a* from the outer peripheral side toward the inner peripheral side of the support part 60 while extending in the radial direction.

With this modification of the passage 61, the shapes of the bump foils 32 and the top foils 33 of the one of the thrust foil bearings 30, 30 are modified from the shapes of the bump foils 32 and the top foils 33 of the one of the thrust foil bearings 30, 30 of the turbo compressor 10 according to the first embodiment. That is, the bump foils 32 and the top foils 33 are mounted on the support part 60 such that the position of each passage 61 corresponds to the position of the gap between the corresponding adjacent bump foils 32 and the position of the gap between the corresponding adjacent top foils 33 and such that each passage 61 faces the third supported portion 24*d* in the axial direction. The bump foils 32 and the top foils 33 are mounted on the end face 60*a* of the support part 60 while avoiding the passages 61. This allows the end face 60*a* of the support part 60 to reliably receive the loads of the bump foils 32.

Accordingly, the cooling air in the passage 61 receives a rotational force from the third supported portion 24*d* rotating in the rotational direction R, thereby smoothly flowing, in the passage 61, in the direction intersecting the circumferential direction from the outer peripheral side toward the inner peripheral side of the support part 60.

Other elements and operations of this compressor are the same as those of the turbo compressor 10 according to the first embodiment.

Although the present disclosure has been described based on the first to third embodiments, the present disclosure is not limited to the first to third embodiments, and may be modified within the scope of the present disclosure.

According to the first to third embodiments, the thrust foil bearings 30 include the six bump foils 32 and the six top foils 33, but the number of the bump foils 32 and the number of the top foils 33 are not limited thereto as long as the number of the bump foils 32 matches the number of the top foils 33 and is more than one. The bump foils may be formed integrally with each other by a ring part so as to form a disc shape. The top foils may be formed integrally with each other by a ring part so as to form a disc shape.

According to the first to third embodiments, the passage 61 is located in every circumferential gap 32*f*, but the present disclosure is not limited thereto. Each passage 61 may be located only in some of the circumferential gaps 32*f*.

According to the first to third embodiments, the end of the passage 61 on the inner peripheral side of the support part 60 extends to a vicinity of the inner peripheral edge of the corresponding bump foil 32, but the present disclosure is not limited thereto. The end of the passage 61 on the inner peripheral side may extend over, for example, a half length of the bump foil 32 in the radial direction.

According to the first to third embodiments, the second plate 16 as the partition wall is formed integrally with the support part 60. However, the second plate 16 may be formed separately from the support part 60.

According to the first to third embodiments, the second plate 16 as the partition wall is formed separately from the fourth plate 29. However, the second plate 16 may be formed integrally with the fourth plate 29. In this configuration, instead of the communication groove 29*c*, a through hole may be formed through the integrated part, formed of the second plate 16 and the fourth plate 29, from the outer peripheral surface of the integrated part to the inner peripheral surface of the center hole 29*a*.

The second embodiment may be combined with the third embodiment. This combination allows more effective cooling of the top foils 33 of the one of the thrust foil bearings 30, 30.

The present disclosure is applicable to a fluid machine for a fuel cell system, such as an air compressor.

What is claimed is:

1. A turbo fluid machine comprising:
a rotary shaft configured to rotate about an axis of the rotary shaft;
a thrust collar having a plate shape and extending from a peripheral surface of the rotary shaft in a radial direction of the rotary shaft, the thrust collar being rotatable together with the rotary shaft;
an operating part configured to rotate together with the rotary shaft to compress and discharge a fluid;
a housing accommodating the rotary shaft, the thrust collar, and the operating part;
a partition wall having an insertion hole which is formed through the partition wall and through which the rotary shaft is inserted, the partition wall separating an inside of the housing into a compression space in which the operating part is accommodated and a bearing space in which the thrust collar is accommodated; and
a foil bearing supporting the thrust collar in an axial direction of the rotary shaft such that the thrust collar is rotatable relative to the partition wall, wherein
the partition wall includes a support part having an end face raised toward the thrust collar in the axial direction,
the support part has a groove formed in the end face and extending in the radial direction to an outer peripheral surface of the support part,
the foil bearing includes: a plurality of bump foils each formed of an elastic plate having a corrugated shape and mounted on the end face; and a plurality of top foils each formed of an elastic plate, wherein the bump foils are arranged around the insertion hole with a gap between the adjacent bump foils, wherein the top foils are arranged around the insertion hole with a gap between the adjacent top foils, and each have one surface facing the thrust collar and another surface elastically supported by the corresponding bump foil, and
the foil bearing is mounted on the support part such that a position of the groove corresponds to a position of the gap between the bump foils and a position of the gap between the top foils so that the groove faces the thrust collar in the axial direction.

2. The turbo fluid machine according to claim 1, wherein the groove has a pair of groove side surfaces facing each other in a circumferential direction of the rotary shaft to define the groove, a bottom surface, and an opening edge, and
one of the groove side surfaces preceding the other groove side surface of the pair of groove side surfaces in a rotational direction of the rotary shaft is inclined in the rotational direction from the bottom surface to the opening edge while extending in the axial direction.

3. The turbo fluid machine according to claim 1, wherein the groove is inclined in the rotational direction from an outer peripheral side toward an inner peripheral side of the support part while extending in the radial direction.

* * * * *